US010895336B2

(12) United States Patent
Koyuncu et al.

(10) Patent No.: US 10,895,336 B2
(45) Date of Patent: Jan. 19, 2021

(54) TUBE CONNECTING DEVICE

(71) Applicant: BANTBORU SANAYI VE TICARET ANONIM SIRKETI, Gebze (TR)

(72) Inventors: Ozan Koyuncu, Gebze (TR); Onur Tokul, Gebze (TR)

(73) Assignee: BANTBORU SANAYI VE TICARET ANONIM SIRKETI, Gebze (TR)

(*) Notice: Subject to any disclaimer, the term of this patent is extended or adjusted under 35 U.S.C. 154(b) by 302 days.

(21) Appl. No.: 15/987,242

(22) Filed: May 23, 2018

(65) Prior Publication Data

US 2018/0363814 A1    Dec. 20, 2018

(30) Foreign Application Priority Data

Jun. 14, 2017   (DE) .................... 10 2017 113 195

(51) Int. Cl.
*F16L 15/04*      (2006.01)
*B60T 17/04*      (2006.01)
*F16L 19/028*     (2006.01)
*F16L 19/05*      (2006.01)
*F16L 19/02*      (2006.01)

(52) U.S. Cl.
CPC ............ *F16L 15/04* (2013.01); *B60T 17/043* (2013.01); *F16L 19/028* (2013.01); *F16L 19/0218* (2013.01); *F16L 19/05* (2013.01)

(58) Field of Classification Search
CPC . F16L 19/0218; F16L 19/0225; F16L 19/025; F16L 19/028; F16L 19/0283; F16L 19/0286; F16L 19/041; F16L 19/04; F16L 19/05; F16L 13/10; F16L 13/103

USPC ... 285/332.3, 334.5, 353, 384, 382.5, 382.4, 285/915

See application file for complete search history.

(56) References Cited

U.S. PATENT DOCUMENTS

| | | | | |
|---|---|---|---|---|
| 1,893,441 A | * | 1/1933 | Parker ..................... | F16L 19/04 285/334.5 |
| 2,026,168 A | * | 12/1935 | Guarnaschelli ......... | F16L 19/04 285/334.5 |
| 2,300,584 A | * | 11/1942 | Martin .................... | F16L 19/04 285/234 |
| 2,466,521 A | * | 4/1949 | Weatherhead, Jr. .... | F16L 19/04 285/334.5 |

(Continued)

FOREIGN PATENT DOCUMENTS

DE      102008057425      7/2009

*Primary Examiner* — Aaron M Dunwoody
(74) *Attorney, Agent, or Firm* — Crose Law LLC; Bradley D. Crose

(57) ABSTRACT

The present invention relates to a tube connecting device in particular for tubes having a flared end. Tube connecting device comprising a tube having a flared end defining a front surface and a rear surface; a threaded sleeve having a through opening for receiving the tube, a connector having a conical seating surface for receiving the front surface of the flared end and a threaded portion being meshable with the threaded sleeve, a ring arranged between the rear surface of the flared end and the threaded sleeve when the threaded sleeve is screwed. The tube connection device of the invention is characterized by the ring is fixed to the rear surface of the flared end before the tube connection is made and the ring maintains its fixation along the connection is made.

19 Claims, 6 Drawing Sheets

(56) References Cited

U.S. PATENT DOCUMENTS

| | | | | |
|---|---|---|---|---|
| 5,109,888 | A * | 5/1992 | Usui | B21D 39/04 |
| | | | | 138/109 |
| 6,527,304 | B1 * | 3/2003 | Pliassounov | F16L 19/025 |
| | | | | 285/233 |
| 6,663,146 | B1 * | 12/2003 | Sakai | F16L 19/0286 |
| | | | | 285/148.26 |
| 9,328,701 | B2 * | 5/2016 | Eller | F01N 3/025 |
| 2006/0028017 | A1 * | 2/2006 | Sausner | F16L 41/14 |
| | | | | 285/136.1 |
| 2009/0189391 | A1 * | 7/2009 | Ferlin | F16L 19/0286 |
| | | | | 285/382.5 |
| 2018/0355829 | A1 * | 12/2018 | Kondo | B21K 21/12 |

* cited by examiner

TUBE CONNECTING DEVICE

CROSS-REFERENCE TO RELATED APPLICATIONS AND CLAIM TO PRIORITY

This application is related to application number DE 102017 113 195.7, filed Jun. 14, 2017 in the Federal Republic of Germany, the disclosure of which is incorporated herein by reference and to which priority is claimed.

FIELD OF THE INVENTION

The present invention relates to a tube connecting device in particular for tubes having a flared end. Such tubes may be suitable for use in various applications, including brake lines for automobiles, which requires high-security tube connections for the avoidance of leakage of breaking hydraulic fluid.

BACKGROUND OF THE INVENTION

Flared pipes/tubes are usually used in cases where a relatively precise connection is needed between a pipe and a connector. For instance, it is required to make such connection securely in cases where high-pressure fluid transfer from the pipe to the connector part is needed. Otherwise, there may arise a leak in the pipe to connector connection, and it will not be possible to transfer the liquid to the connector at desired pressure.

The connector comprises a conical housing for the flared pipe connection, and after the conical surface of the flared head is seated on the conical housing in the connector, it is secured via a connecting means. The connecting means is generally a threaded sleeve, and the connection is fixed by the engagement of the threads of the sleeve with threads formed on the connector.

Perhaps, one of the key considerations in flared pipe connections is the torsion stress accumulated on the tube. Such torsion stress is inclined to be formed on the tube during securing the connection and may later lead to loosen the connection due to elastic deformations occurred on the tube caused by the torsion stress. Loosening the tube connection may never be allowed, where such connection is used in brake lines of automobiles in particular.

There have been some proposals made in the art to eliminate the accumulation of stress on tubes when securing the connection. U.S. Pat. No. 8,172,278 discloses a tube connection device with the threaded surfaces and surfaces where connecting means contacts to the flared head of the tube coated. U.S. Pat. No. 8,172,278 seems to bring along some disadvantages where in particular the tube connection is removed and then re-secured, which is typically required for several times for maintenance when mounted on an automobile.

Typically, the tube, so the flared end thereof, is made of a softer material than that of the threaded sleeve. When the threaded sleeve contacts and forces the flared end of the tube for achieving the connection, there occur some plastic deformations at the contact point and such deformations would lead fracture of coatings of the threaded sleeve and possible deformation on the contact surface of the flared end of the tube. Thus, the structural deformation at the contact surface affects the security of the connection negatively for a further time. This is because of the fact that the structural deformation increases friction and thus accumulation of torsion stress on the tube when screwing the threaded sleeve.

U.S. Pat. No. 7,533,909 discloses a tube connection device comprising a pressure element, such as a ring, movably placed between the threaded sleeve and the rear side of the flared end. U.S. Pat. No. 7,533,909 further discloses that the friction between flared end and the connector is bigger than the friction between rear side of the flared end and the lower surface of the pressure element. Furthermore, the latter friction is bigger than the friction between the upper surface of the pressure element and the threaded sleeve.

Some disadvantages seem to be inherent in U.S. Pat. No. 7,533,909. Firstly, the ring is typical to be made of a harder material than that of tube and it would cause some plastic deformation at the rear side of the flared end thereof when the connection is secured. This leads to friction increase between the ring and the rear side of the flared end for a further time of connection. The friction increase is likely the torsion stress to accumulate on the tube so making vulnerable the connection to loosen.

Furthermore, the rear surface of the flare end of the tube may actually not be smooth which is induced by the formation of the flare. In particular, the end of a tube is flared through a support member against which the tube-end is rested, and the tube-end is pushed towards the support member for having the flare shape. When the support member is removed there remains a protrusion extending as a line-form at the rear side of the flare end. This protrusion is adverse to a secure tube connection as it increases friction between the ring and flare end, resulting stress accumulation on the tube.

SUMMARY OF THE INVENTION

The object of the present invention is to provide an efficient flared pipe connection.

The present invention relates to a tube connecting device comprising a tube having a flared end defining a front surface and a rear surface; a threaded sleeve having a through opening for receiving the tube, a connector having a conical seating surface for receiving the front surface of the flared end and a threaded portion being meshable with the threaded sleeve, a ring arranged between the rear surface of the flared end and the threaded sleeve when the threaded sleeve is screwed. The tube connection device of the invention is characterized by the ring is fixed to the adjacent of the rear surface of the flared end before the tube connection is made and the ring maintains its fixation along the connection is made.

In this application, it should be understood by "fixing" the ring that the ring is "immovably" connected, i.e. the ring is not allowed to make a relative motion after it is fixed. The fixation of the ring may be achieved by using a bonding agent or may be by force fitting etc.

The ring of the invention is preferably coated with an antifriction material and the surfaces of the ring, i.e. the lower surface fixed to the flare end, and the upper surface contacting the threaded sleeve is smooth. The surface roughness of the ring may be around Rz 15 μm, and preferably less than 25 μm.

BRIEF DESCRIPTION OF THE DRAWINGS

The present invention should be evaluated with the figures described below to ensure the best understanding of the embodiment and advantages together with the additional elements of the invention.

DETAILED DESCRIPTION OF THE PREFERRED EMBODIMENT(S)

Figure 1:
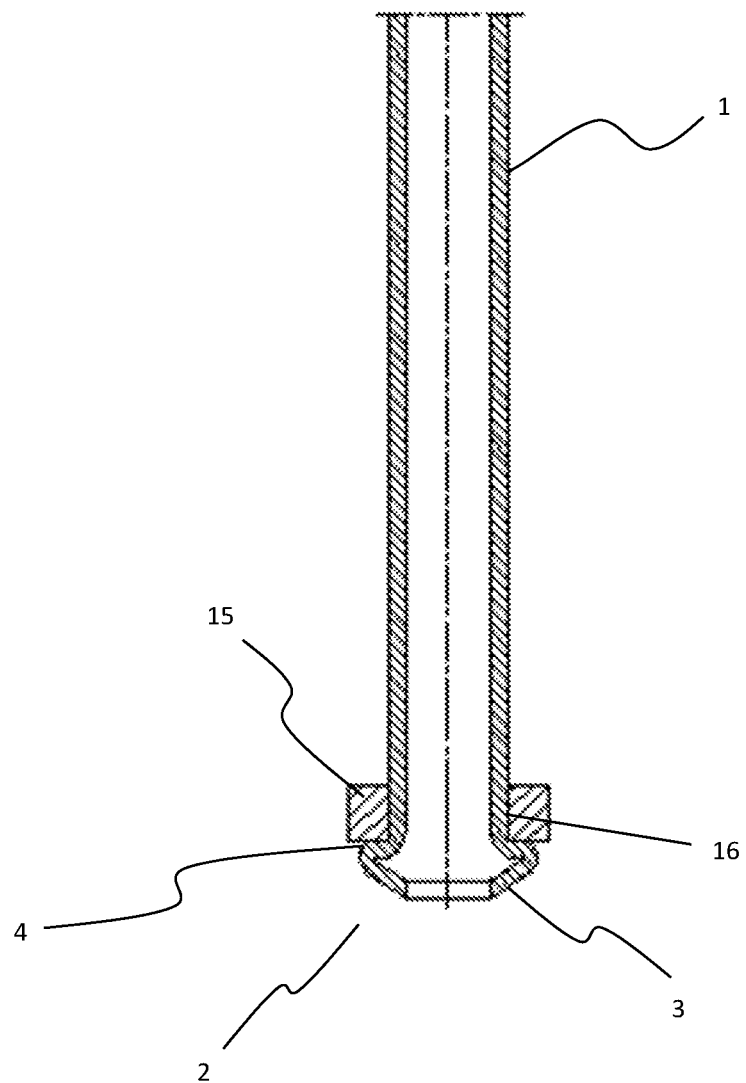
FIG. 1 illustrates a male flared tube in a front view.
Figure 2:
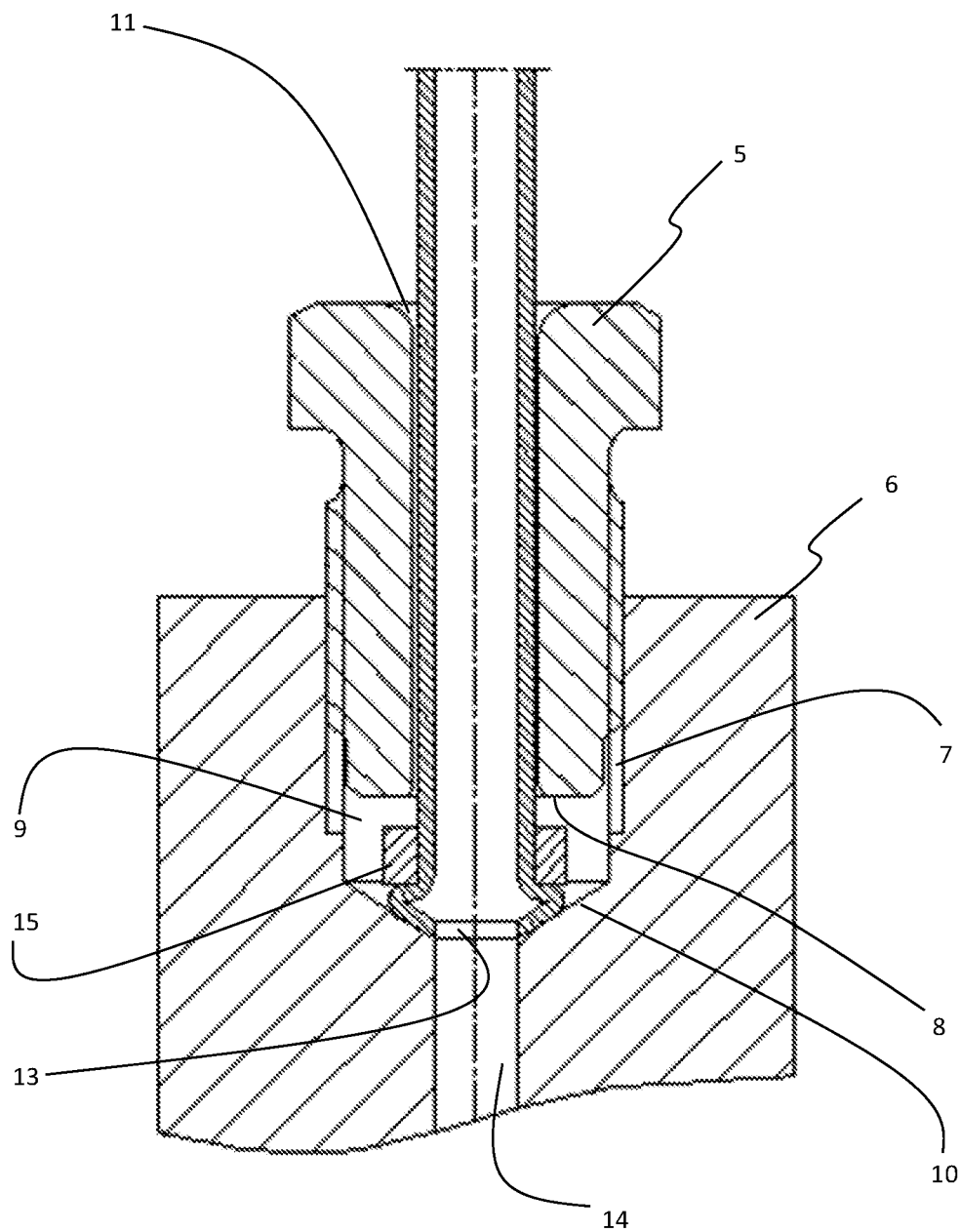
FIG. 2 illustrates a tube connecting device according to the present invention, having a male flared tube in cross-sectional view.

The tube connecting device according to the invention comprises a tube (1) having a flared end (2), a connector (6) having a seating surface (10) for seating the flared end (2) of the tube (1), and a sleeve (5) threadably connected to the connector (6). The flared end (2) of the tube (1) defines a front surface (3) being of a conical form, and a rear surface (4) preferably being of a flat surface, i.e. perpendicular to the tube axis. There is fixed a ring (15) to the adjacent of the rear surface (4) of the flared end (2), i.e. before the connection is made.

The fixation of the ring (15) can be rendered using a bonding agent to be applied on the rear surface (4) and then the ring (15) is pushed towards the rear surface (4) and maintained there for fixing. The bonding agent can also be applied to the tube portion (16) by the upper side of the rear surface. Alternatively, the bonding agent can only be applied to the tube portion (16) by the upper side of the rear end, i.e. without applying to the rear surface.

The bonding agent to be used may preferably be a fast-effecting adhesive such as cyanoacrylate adhesives (also known as Super Glue™). The fixation of the ring (15) can alternatively be rendered by shrink-fit, which is achieved by inserting a pin (17) through the tube outlet (13) while the ring is maintained at the rear surface (4). The diameter of the pin would be slightly bigger than that of the inner diameter of the tube in this alternative. As a further alternative, the fixation of the ring (15) can be rendered by crimping wherein a crimping tool is applied tangentially on the ring to form a crimped surface (18) while it is maintained at the rear surface (4).

The thickness of the ring (15) can be of any suitable size in use, it may preferably be between 1 to 3 mm. The ring (15) can be coated by an anti-friction material such as Molybdenum disulfide (MoS$_2$), Polythetrafluoroetylene (PTFE), graphite, or polyethylene. The anti-firction material is at least applied to the upper surface of the ring, i.e. facing the sleeve. The coating may also be applied to the entire ring. The surface roughness of the ring to which an anti friction coating material to be applied may be Ra 1 μm-2 μm.

In case the fixation of the ring (15) is rendered by a bonding agent, the thickness of the bonding agent may preferably be between 0.01 to 0.2 mm, and more preferably between 0.02 to 0.07 mm.

Figure 3:
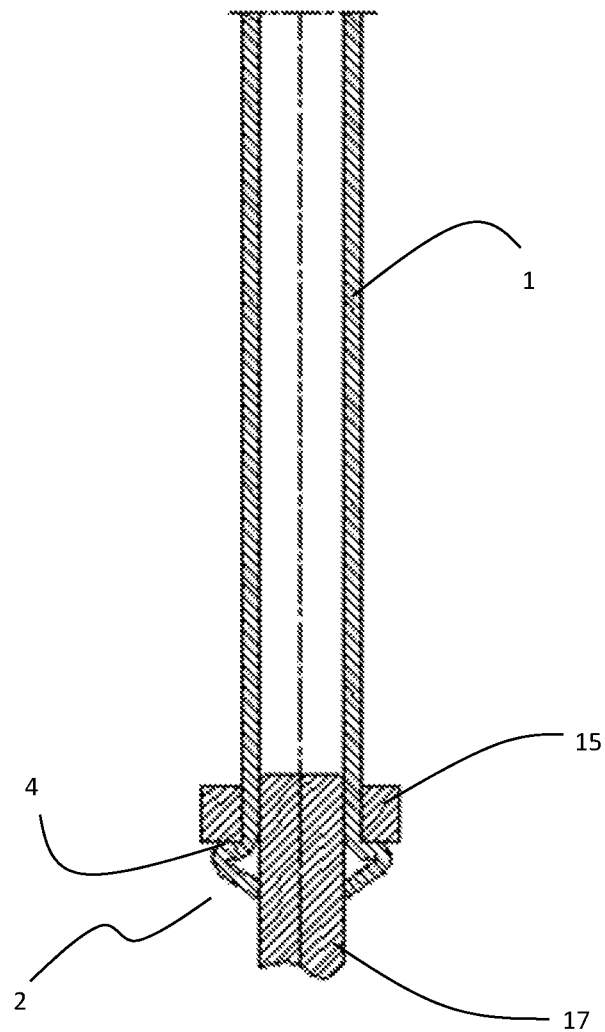
FIG. 3 illustrates a male flared tube with a pin shrinking-fit the ring thereon.
Figure 4:
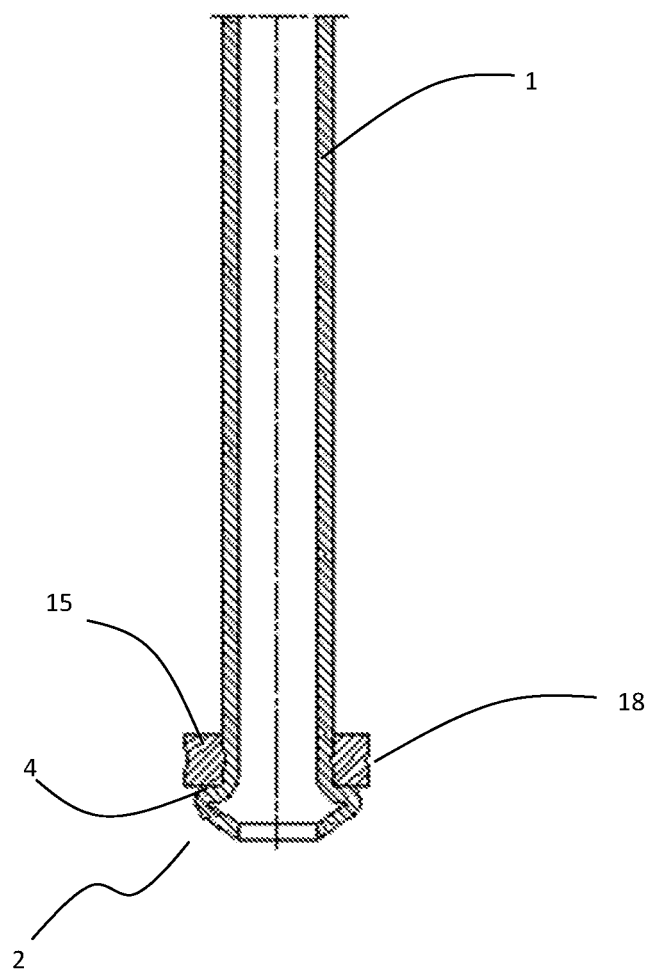
FIG. 4 illustrates a male flared tube with the ring fixed thereon by crimping.
Figure 5:
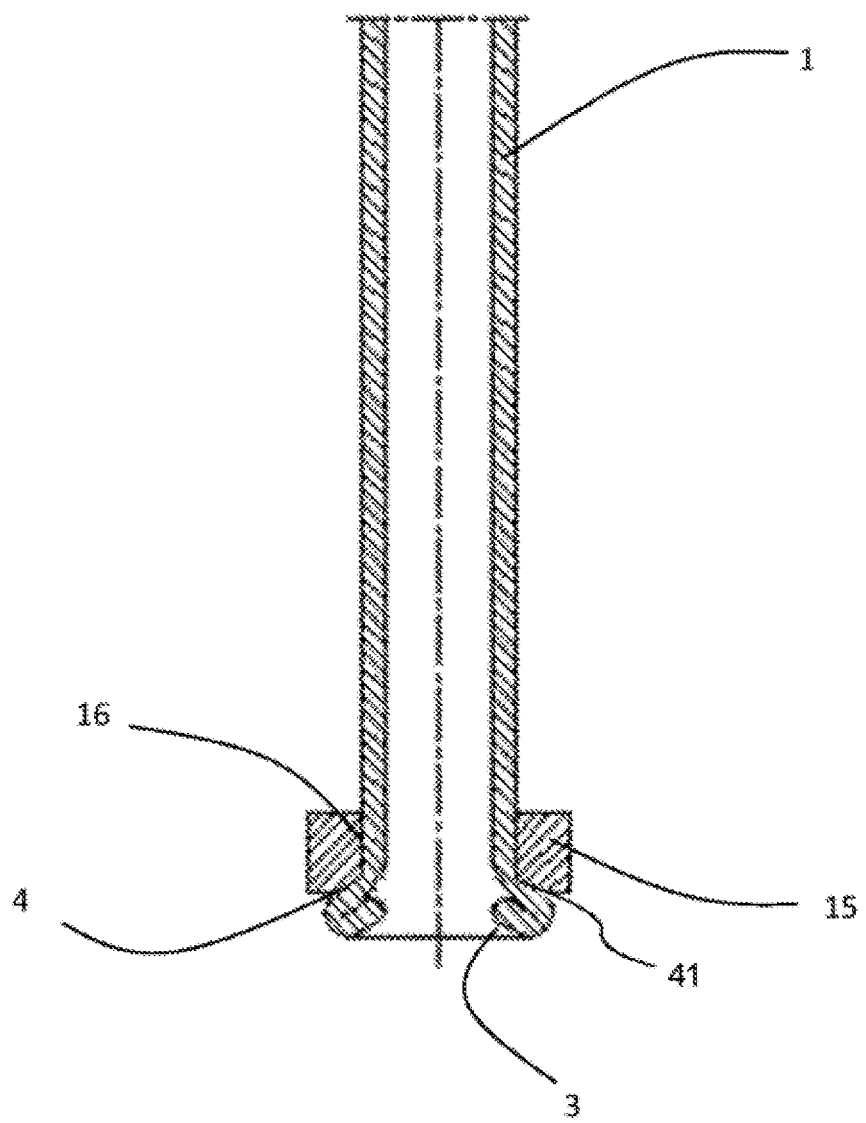
FIG. 5 illustrates a female flared tube in a front view.
Figure 6:
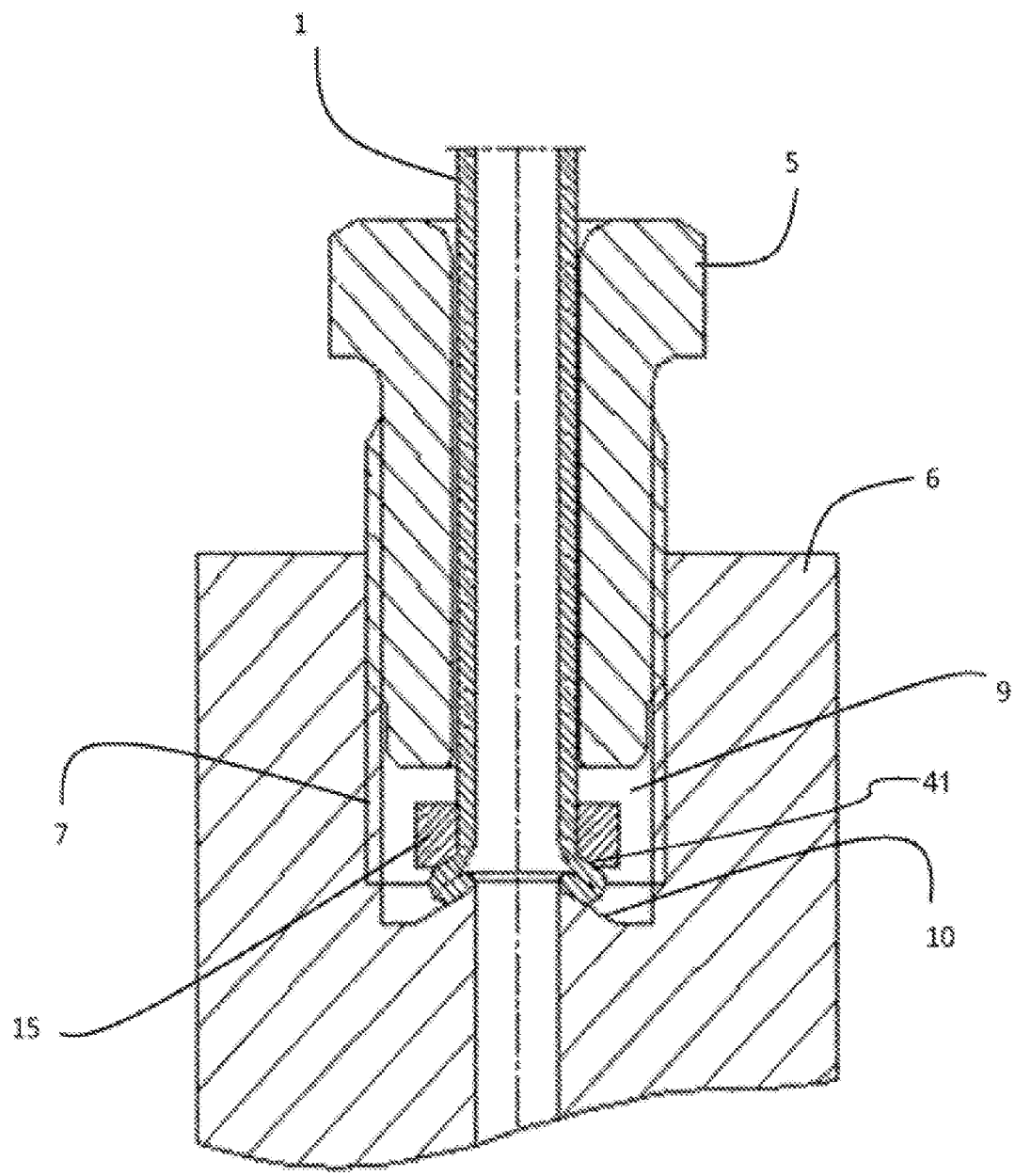
FIG. 6 illustrates a female flared tube arranged in a connector and threaded sleeve before screwing for connection.

The ring (15) is formed to have an outer diameter to sufficiently cover the rear surface (4) of the flared end (2), and the ring (15) has an inner diameter through which the tube (1) can be comfortably passed from the other end which is not flared. It is appreciated that the rear surface (4) may be of some other forms other than being flat in which case the corresponding ring surface, i.e. its lower surface, has a complementary form. FIGS. 3 and 4 represent such an embodiment illustrating a female flared (41) end wherein the rear surface (4) has a conical form so the relevant contacting surface of the ring does.

The connector (6) comprises a housing (9) formed annularly therein and a cavity (14) co-axially extending from the housing (9). The housing (9) and the cavity (14) together define a through opening in the connector (6) and the diameter of the cavity (14) is smaller than that of the housing (9). The connector (6) further comprises a seating surface (10) having a conical form tapering from the end of the housing to the start of the cavity (14).

In use, the tube (1) is passed through the housing (9) and the front surface (3) of the flared end (2) is seated on the seating surface (10) of the connector (6) such that the tube axis is co-axial with the cavity (14) axis. The diameter of the tube outlet (13) is sized such that it is substantially same with the diameter of the cavity (14). The tapering angle of the front surface (3) is preferably formed to be 115° and it would increase little more, say 120°, to match the tapering angle of the seating surface (10) when the sleeve is screwed.

Following seating the flared end (2) on the seating surface (10), the sleeve (5) encompassing the tube (1) along its axis via a through opening (11) is screwed to the connector (6), to its threaded portion (7), and the tip (8) of the sleeve (5) exerts axial force to the upper side of the ring (15) so that the front surface (3) of the flared end (2) sealingly abuts the seating surface (10) of the connector (6).

The ring (15) is so fixed to the rear surface (4) that the torque required to break it off from the rear surface (4) is preferably between 0.3 to 20 Nm. More preferably, the subject torque is between 1 to 10 Nm, and most preferably the torque is between 3 to 7 Nm.

We claim:

1. A tube connecting device, comprising: a tube (1) having a flared end (2) defining a conical front surface (3) and a rear surface (4); a threaded sleeve (5) having a through opening (11) for receiving the tube (1), a connector (6) having a conical seating surface (10) for receiving the front surface (3) of the flared end (2) and a threaded portion being meshable with the threaded sleeve (5), a ring (15) arranged between the rear surface (4) of the flared end (2) and the threaded sleeve (5) when the threaded sleeve is screwed, characterized in that the ring (15) is fixed to the adjacent of the rear surface (4) of the flared end (2) before the tube connection is made and the ring (15) maintains fixation along the connection is made and a bonding agent fixes the ring (15) to the rear surface (4).

2. A tube connecting device according to claim 1, wherein the ring (15) is fixed on the rear surface (4).

3. A tube connecting device according to claim 2, wherein the ring (15) is at least partially coated with an anti-friction material.

4. A tube connecting device according to claim 3, wherein the anti-friction material is selected from a material consisting of molybdenum disulfide (MoS2), Polythetrafluoroetylene (PTFE), graphite, or polyethylene.

5. A tube connecting device according to claim 2, wherein the rear surface (4) is of flat form.

6. A tube connecting device according to claim 1, wherein the ring (15) is fixed to a tube portion (16) by the upper side of the rear surface (4).

7. A tube connecting device according to claim 6, wherein the ring (15) is at least partially coated with an anti-friction material.

8. A tube connecting device according to claim 6, wherein a bonding agent fixes the ring (15) to the rear surface (4).

9. A tube connecting device according to claim 6, wherein the rear surface (4) is of flat form.

10. A tube connecting device according to claim 1, wherein the bonding agent is a cyanoacrylate adhesive.

11. A tube connecting device according to claim 10, wherein the thickness of the bonding agent is between 0.02 to 0.07 mm.

12. A tube connecting device according to claim 1, wherein the thickness of the bonding agent is between 0.01 to 0.2 mm.

13. A tube connecting device according to claim 1, wherein the rear surface (4) is of flat form.

14. A tube connecting device according to claim 1, wherein the rear surface (4) is of conical form.

15. A tube connecting device according to claim 1, wherein the flared end (2) is of a male form.

16. A tube connecting device according to claim 1, wherein the rear surface (4) is of female flared (41) form.

17. A tube connecting device according to claim 16, wherein the torque required to break the ring off from the rear surface (4) is between 1 to 10 Nm.

18. A tube connecting device according to claim 1, wherein the torque required to break the ring off from the rear surface (4) is between 0.3 to 20 Nm.

19. A tube connecting device according to claim 18, wherein the torque required to break the ring off from the rear surface (4) is between 3 to 7 Nm.

\* \* \* \* \*